(12) United States Patent
Chiu et al.

(10) Patent No.: US 8,941,608 B2
(45) Date of Patent: Jan. 27, 2015

(54) LIQUID CRYSTAL DISPLAY WITH DETACHABLE TOUCH SENSOR

(75) Inventors: Ming Sheng Chiu, Tainan (TW); Wen Chi Lin, Zhubei (TW); Hung Chen Kao, Luzhu Township, Taoyuan County (TW); Chien Hsiang Tseng, Yangmei (TW); Chia Feng Teng, Taipei (TW)

(73) Assignee: Hannstar Display Corp., New Taipei (TW)

( * ) Notice: Subject to any disclaimer, the term of this patent is extended or adjusted under 35 U.S.C. 154(b) by 161 days.

(21) Appl. No.: 13/491,808

(22) Filed: Jun. 8, 2012

(65) Prior Publication Data

US 2013/0057484 A1 Mar. 7, 2013

(30) Foreign Application Priority Data

Sep. 7, 2011 (TW) .............................. 100132193 A

(51) Int. Cl.
*G06F 3/041* (2006.01)
*G02F 1/1333* (2006.01)
*G06F 1/16* (2006.01)

(52) U.S. Cl.
CPC ........ *G02F 1/133308* (2013.01); *G06F 1/1601* (2013.01); *G06F 1/1637* (2013.01); *G06F 3/0412* (2013.01); *G02F 1/13338* (2013.01); *G02F 2001/13332* (2013.01); *G02F 2201/465* (2013.01)

USPC ........................................................ 345/173

(58) Field of Classification Search
CPC .......... G09G 3/36; G09G 5/00; G06F 1/1624
USPC ............................ 345/173; 361/679; 455/566
See application file for complete search history.

(56) References Cited

U.S. PATENT DOCUMENTS

| | | | | |
|---|---|---|---|---|
| 7,444,717 | B2 * | 11/2008 | Liu et al. .............................. | 24/1 |
| 8,565,829 | B2 * | 10/2013 | Kim et al. ..................... | 455/566 |
| 2010/0328861 | A1 * | 12/2010 | Liu ........................... | 361/679.01 |
| 2011/0058355 | A1 * | 3/2011 | Teng et al. ................... | 362/97.2 |

FOREIGN PATENT DOCUMENTS

| KR | 1020050077409 | * | 2/2005 | .............. H04B 1/38 |
|---|---|---|---|---|
| KR | 2005077409 A | * | 8/2005 | |

* cited by examiner

*Primary Examiner* — Dwayne Bost
*Assistant Examiner* — Chineyere Wills-Burns
(74) *Attorney, Agent, or Firm* — Lowe Hauptman & Ham, LLP

(57) ABSTRACT

A liquid crystal display according to the present disclosure is provided. The liquid crystal display includes a frame, a backlight module, a plurality of hooking members, an LCD panel, and a touch sensor. According to the liquid crystal display of the present disclosure, wherein the hooking members on the frame may secure the touch sensor or the LCD panel on the backlight module without need of using double-sided tapes or optical adhesive.

11 Claims, 5 Drawing Sheets

LIQUID CRYSTAL DISPLAY WITH DETACHABLE TOUCH SENSOR

CROSS REFERENCE TO RELATED APPLICATION

This application claims the priority benefit of Taiwan Patent Application Serial Number 100132193 filed Sep. 7, 2011, the full disclosure of which is incorporated herein by reference.

BACKGROUND OF THE INVENTION

1. Field of the Invention

The present invention relates to a liquid crystal display with a touch sensor, and more particularly, to a liquid crystal display with a detachable touch sensor.

2. Description of the Related Art

Nowadays, a way of manufacturing a Liquid Crystal Display (LCD) with touch function is to attach a touch sensor to an LCD panel. Specifically, the touch sensor is attached to the LCD panel by double-sided tapes or optical adhesive.

However, because there exist a couple of parts positioned on the LCD panel, the surface on the LCD panel for the touch sensor to be attached is rough. Therefore, it is not easy to attach the double-sided tapes firmly. Furthermore, if a liquid UV adhesive is used to attach the touch sensor to the LCD panel, it is likely to flow into the interior of a backlight module and therefore causes an adverse influence on the display performance of the LCD. Furthermore, the opaque parts on the LCD panel may prevent the UV adhesive from the illumination of UV light. This may cause the UV adhesive not to be hardened thoroughly and the touch sensor is not attached firmly to the LCD panel accordingly.

Accordingly, there exists a need to provide a solution to solve the aforesaid problems.

SUMMARY OF THE INVENTION

The present disclosure provides a liquid crystal display, wherein the hooking members on the frame may secure the touch sensor or the LCD panel on the backlight module without need of using double-sided tapes or optical adhesive.

In one embodiment, the liquid crystal display of the present disclosure includes a frame, a backlight module, a plurality of hooking members, an LCD panel, and a touch sensor. The frame has an indentation and includes a first side surface, a second side surface, a third side surface, and a fourth side surface, wherein the first side surface faces the third side surface and the second side surface faces the fourth side surface. The first and third side surfaces connect with the second and fourth side surfaces. The backlight module is positioned in the indentation of the frame. The hooking members are positioned on the first, second, third and fourth side surfaces, respectively. Each of the hooking members has a side portion extending from the frame and a top portion extending from the side portion toward the indentation, wherein an accommodation room is defined between the top portion and an upper surface of the frame. The LCD panel is positioned on the backlight module in a detachable manner and sides of the LCD panel are positioned in the accommodation rooms. The touch sensor is positioned on the LCD panel and sides of the touch sensor are positioned in the accommodation rooms. The top portions of the hooking members press the LCD panel and touch sensor onto the upper surface of the frame to secure the LCD panel and touch sensor on the frame.

In another embodiment, the liquid crystal display of the present disclosure includes a frame, a backlight module, an LCD panel, a plurality of hooking members, and a touch sensor. The frame has an indentation and includes a first side surface, a second side surface, a third side surface, and a fourth side surface, wherein the first side surface faces the third side surface and the second side surface faces the fourth side surface. The first and third side surfaces connect with the second and fourth side surfaces. The backlight module is positioned in the indentation of the frame. The LCD panel is positioned in the indentation of the frame and on the backlight module. The hooking members are positioned on the first, second, third and fourth side surfaces, respectively. Each of the hooking members has a side portion extending from the frame and a top portion extending from the side portion toward the indentation, wherein an accommodation room is defined between the top portion and an upper surface of the frame. The touch sensor is positioned on the LCD panel in a detachable manner, wherein sides of the touch sensor are positioned in the accommodation rooms. The top portions of the hooking members press the touch sensor onto the upper surface of the frame to secure the touch sensor on the frame.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
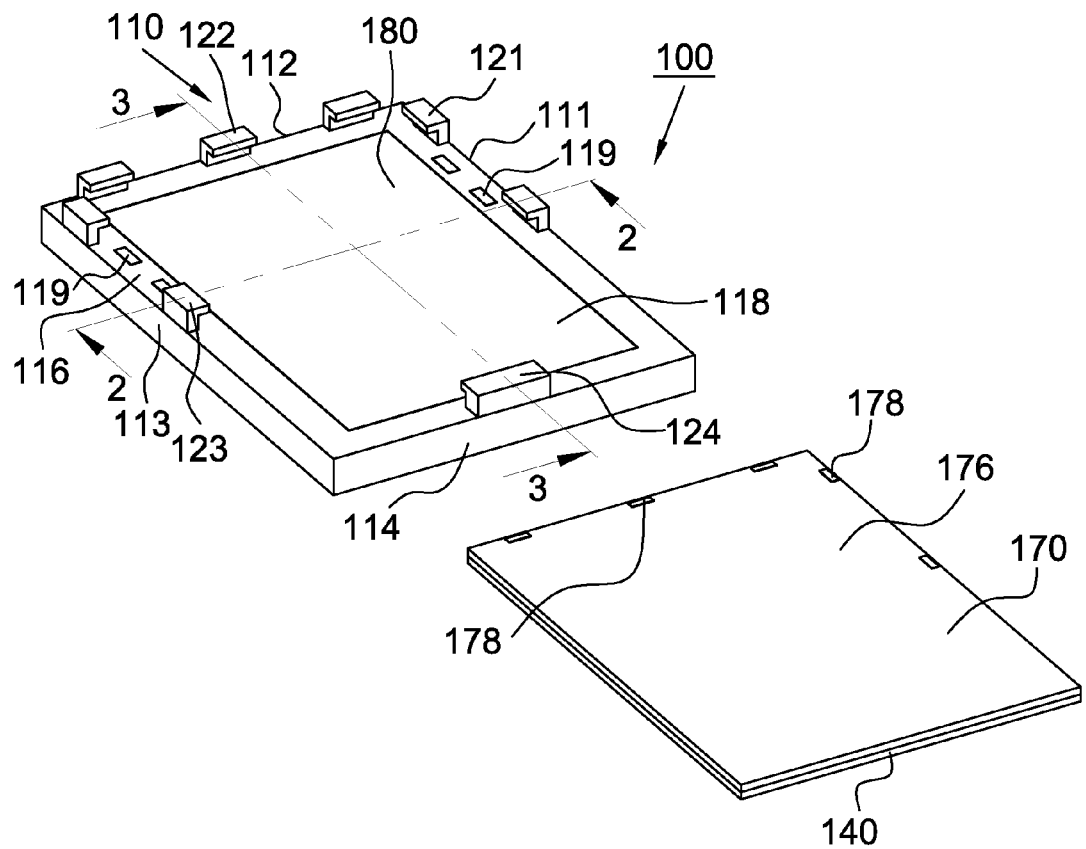
FIG. 1 is an elevated perspective view of the liquid crystal display according to the first embodiment of the present disclosure, wherein the LCD panel and touch sensor are separated from the frame.

Referring to FIGS. 1 to 5, the liquid crystal display 100 according to the first embodiment of the present disclosure includes a frame 110 having a rectangular indentation 118. The frame 110 is generally rectangular and has a first side surface 111, a second side surface 112, a third side surface 113, and a fourth side surface 114, wherein the first side surface 111 faces the third side surface 113 and the second side surface 112 faces the fourth side surface 114. The first and third side surfaces 111, 113 connect with the second and fourth side surfaces 112, 114.

Figure 2:
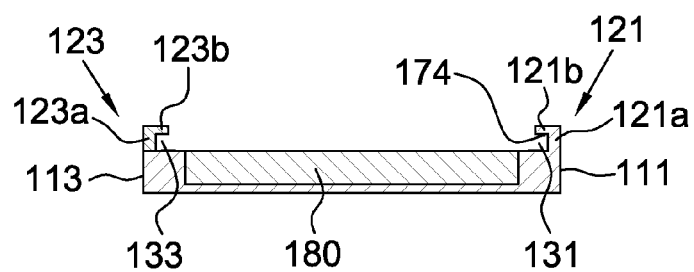
FIG. 2 is a cross-sectional view taken along line 2-2 of FIG. 1.
Figure 3:
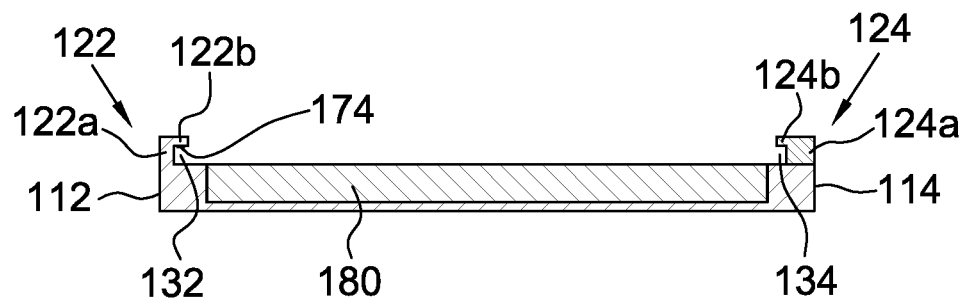
FIG. 3 is a cross-sectional view taken along line 3-3 of FIG. 1.
Figure 4:
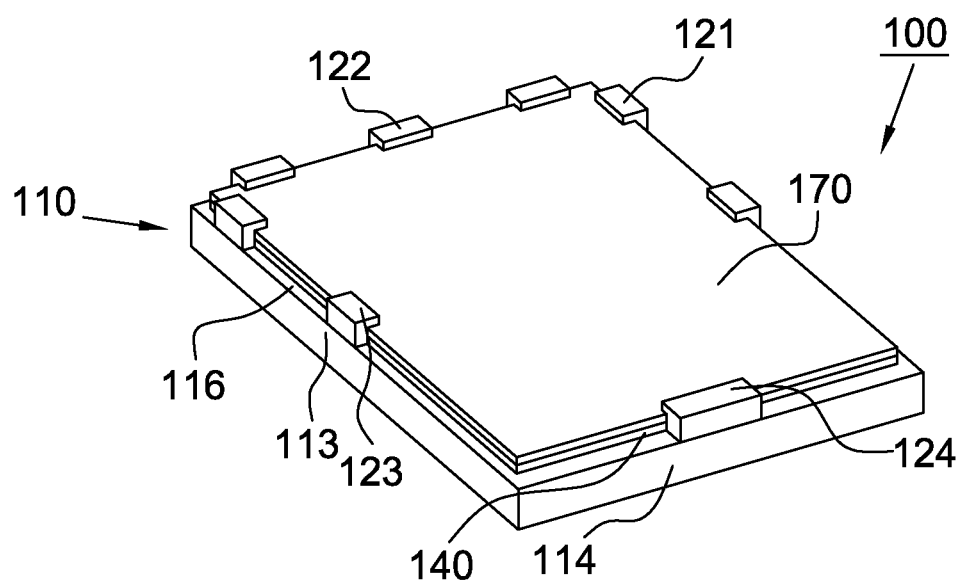
FIG. 4 is an elevated perspective view of the liquid crystal display according to the first embodiment of the present disclosure.

At least one hooking member 121, at least one hooking member 122, at least one hooking member 123, and at least one hooking member 124 are provided on the first, second, third, and fourth side surfaces 111, 112, 113, 114 on an upper surface 116 of the frame 110, respectively. Referring to FIGS. 2 and 3, the hooking members 121, 122, 123, 124 have side portions 121*a*, 122*a*, 123*a*, 124*a* extending from the side surfaces 111, 112, 113, 114, respectively and top portions 121*b*, 122*b*, 123*b*, 124*b* horizontally extending from the side portions 121*a*, 122*a*, 123*a*, 124*a* toward the indentation 118, respectively. It means that each of the hooking members 121, 122, 123, 124 has a cross section of the shape of the number "7". Therefore, accommodation rooms 131, 132, 133, 134 are defined between the top portions 121*b*, 122*b*, 123*b*, 124*b* and the upper surface 116 of the frame 110, respectively.

A backlight module 180 is embedded in the indentation 118 of the frame 110, which includes a backlight source and several optical films. A surface of the backlight module 180 is generally flush with the upper surface 116 of the frame 110. In addition, the liquid crystal display 100 of the present disclosure further includes a rectangular liquid crystal display (LCD) panel 140, which is positioned on the backlight module 180 in a detachable manner. That is to say, the LCD panel 140 is not bonded to the backlight module 180 by adhesive. A rectangular touch sensor 170 is glued to or positioned in a detachable manner on the LCD panel 140. In order to secure both the LCD panel 140 and touch sensor 170 on the backlight module 180, sides of the LCD panel 140 and touch sensor 170 are positioned in the accommodation rooms 131, 132, 133, 134 such that the top portions 121*b*, 122*b*, 123*b*, 124*b* of the hooking members 121, 122, 123, 124 press directly or indirectly the LCD panel 140 and touch sensor 170 upon the upper surface 116 of the frame 110. By this arrangement the LCD panel 140 and touch sensor 170 may be secured on the frame 110 (see FIG. 4).

Figure 5:
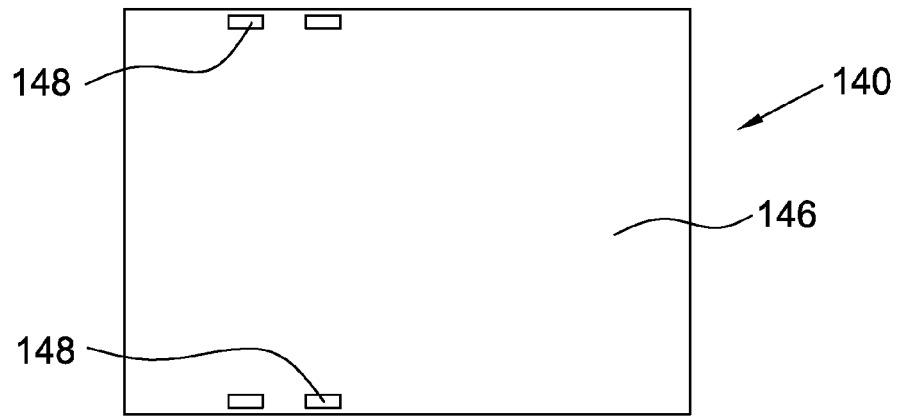
FIG. 5 is a bottom view of the LCD panel of FIG. 1.
Figure 6:
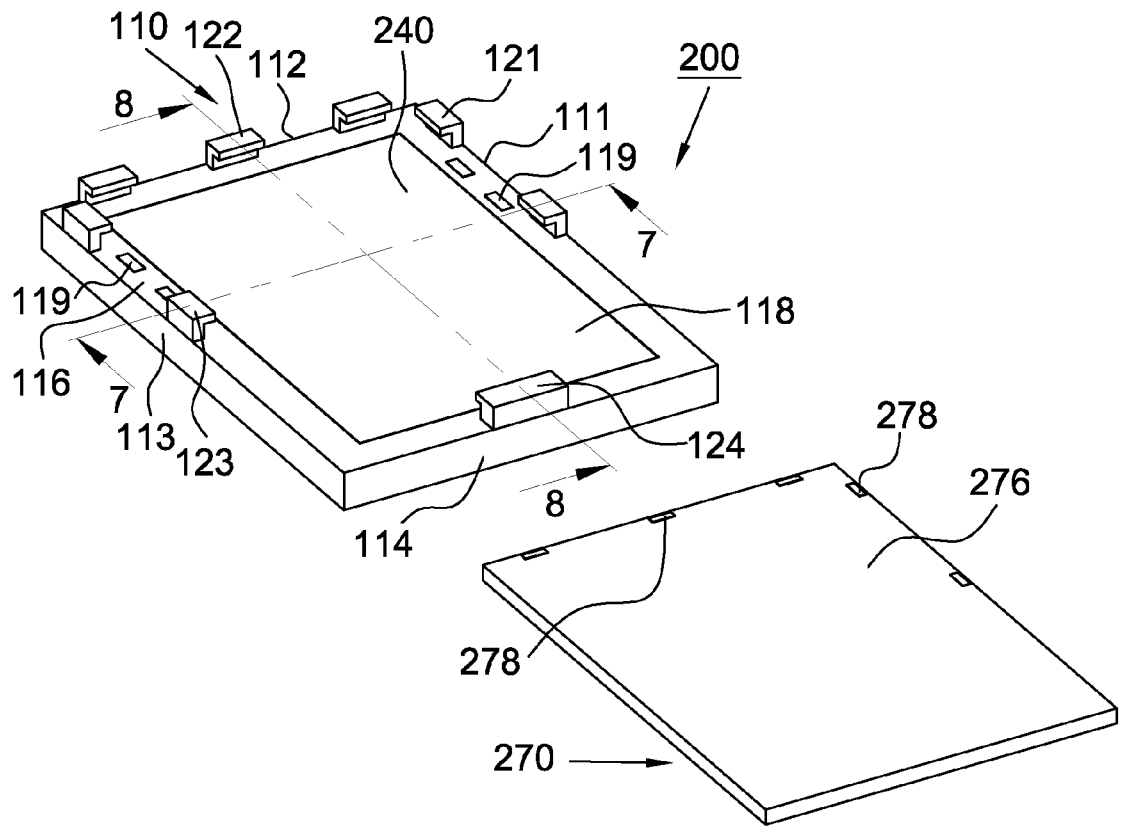
FIG. 6 is an elevated perspective view of the liquid crystal display according to the second embodiment of the present disclosure, wherein the touch sensor is separated from the frame.
Figure 7:
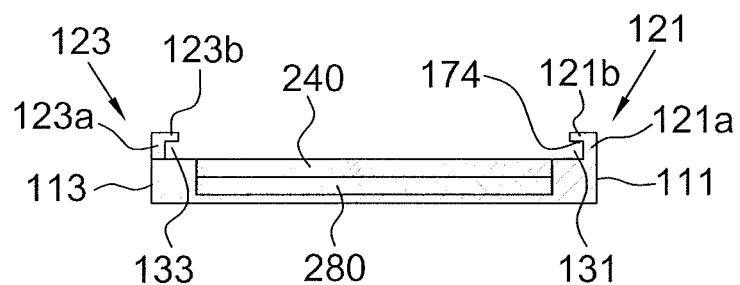
FIG. 7 is a cross-sectional view taken along line 7-7 of FIG. 6.
Figure 8:
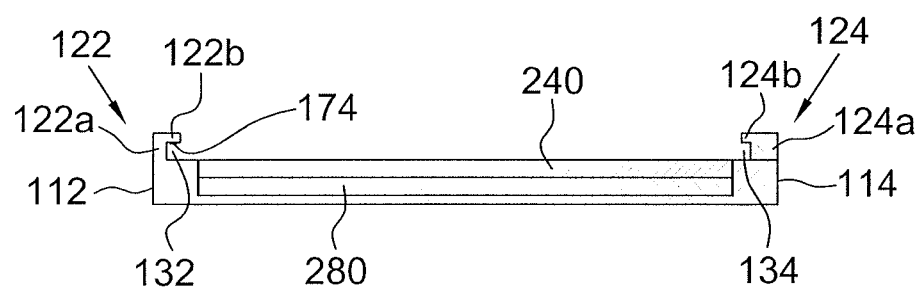
FIG. 8 is a cross-sectional view taken along line 8-8 of FIG. 6.
Figure 9:
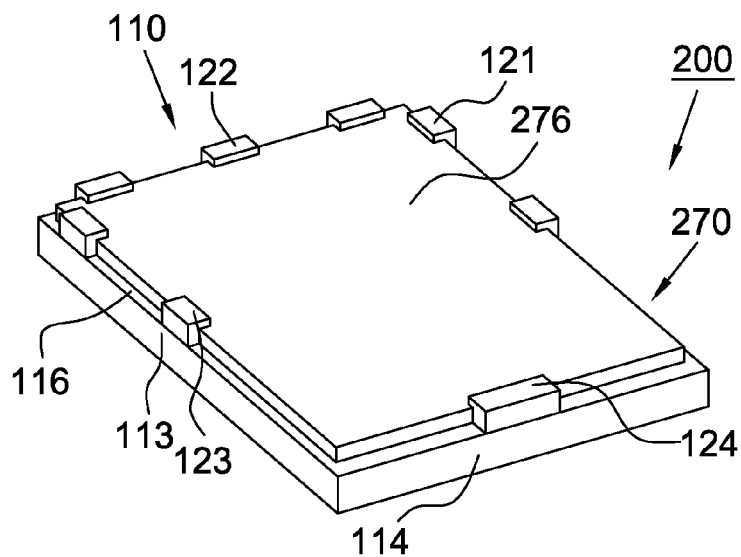
FIG. 9 is an elevated perspective view of the liquid crystal display according to the second embodiment of the present disclosure.

In order to have the LCD panel 140 function, there is a plurality of electrical terminals 119 provided on the upper surface 116 of the frame 110. The electrical terminals 119 are electrically connected to wirings on the frame 110. Referring to FIG. 5, a plurality of electrical terminals 148 corresponding to the electrical terminals 119 is provided on a lower surface 146 of the LCD panel 140. When the LCD panel 140 is positioned on the frame 110, the electrical terminals 148 on the LCD panel 140 will be brought into electrical contact with the electrical terminals 119 on the frame 110. A driving voltage may be applied to the LCD panel 140 through the wirings on the frame 110 thereby driving the LCD panel 140.

In order to have the touch sensor 170 function, a plurality of electrical terminals 174 is provided on a bottom of at least one of the top portions 121*b*, 122*b*, 123*b*, 124*b*. For example, the electrical terminals 174 are provided on the bottoms of the top portions 121*b* and/or 122*b*. The electrical terminals 174 are electrically connected to other wirings on the frame 110 (not shown in the figure). A plurality of electrical terminals 178 corresponding to the electrical terminals 174 is provided on an upper surface 176 of the touch sensor 170. When the touch sensor 170 is positioned on the LCD panel 140, the electrical terminals 178 on the touch sensor 170 will be brought into electrical contact with the electrical terminals 174 on the hooking members 121, 122. A driving voltage may be applied to the touch sensor 170 through the wirings on the frame 110 thereby driving the touch sensor 170.

In order to facilitate the LCD panel 140 and touch sensor 170 to be positioned on the backlight module 180, several of the hooking members may be detached easily from the frame 110. For example, the hooking members 123 and/or 124 may be detached from the frame 110. When assembling the liquid crystal display 100 of the present disclosure, the hooking members 123, 124 are detached from the frame 110 first so that the LCD panel 140 and touch sensor 170 may be pushed to the top of the backlight module 180. Afterward, the detached hooking members 123, 124 are mounted on the frame 110 to secure the LCD panel 140 and touch sensor 170 on the frame 110.

In another embodiment, the hooking members 121, 122, 123, 124 are elastic and are attached to the frame 110. For example, the hooking members 121, 122, 123, 124 may be elastic sheets. When assembling the liquid crystal display 100, the hooking members 121, 122, 123, 124 are pulled outwardly such that the LCD panel 140 and touch sensor 170 may be put down to the top of the backlight module 180. Afterward, the pull force is removed, the elastic hooking members 121, 122, 123, 124 will return to their original positions to secure the LCD panel 140 and touch sensor 170 on the frame 110.

According to the liquid crystal display 100 of the present disclosure, the hooking members 121, 122, 123, 124 may secure the LCD panel 140 and touch sensor 170 on the backlight module 180 without need of using double-sided tapes or optical adhesive. This solves the prior art problems.

Referring to FIGS. 6 to 10, the liquid crystal display 200 according to the second embodiment of the present disclosure includes the frame 110 described in the first embodiment, where identical reference numbers has been used when designating substantially identical elements that are common to the figures. In addition, the liquid crystal display 200 further includes a backlight module 280, which is embedded in the indentation 118 of the frame 110. A liquid crystal display (LCD) panel 240 is also positioned in the indentation 118 of the frame 110. The LCD panel 240 is positioned on the backlight module 280 and a surface of the LCD panel 240 is generally flush with the upper surface 116 of the frame 110. A rectangular touch sensor 270 is positioned on the LCD panel 240 in a detachable manner. In order to secure the touch sensor 270 on LCD panel 240, sides of the touch sensor 270 are positioned in the accommodation rooms 131, 132, 133, 134 such that the top portions 121*b*, 122*b*, 123*b*, 124*b* of the hooking members 121, 122, 123, 124 press directly or indirectly the touch sensor 270 upon the upper surface 116 of the frame 110. By this arrangement the touch sensor 270 may be secured on the frame 110 (see FIG. 9).

Similarly, in order to have the touch sensor 270 function, a plurality of electrical terminals 278 corresponding to the electrical terminals 174 on the hooking members 121, 122 is provided on an upper surface 276 of the touch sensor 270. When the touch sensor 270 is positioned on the frame 110, the electrical terminals 278 on the touch sensor 270 will be brought into electrical contact with the electrical terminals 174 on the hooking members 121, 122. A driving voltage may be applied to the touch sensor 270 through the wirings on the frame 110 thereby driving the touch sensor 270.

Figure 10:
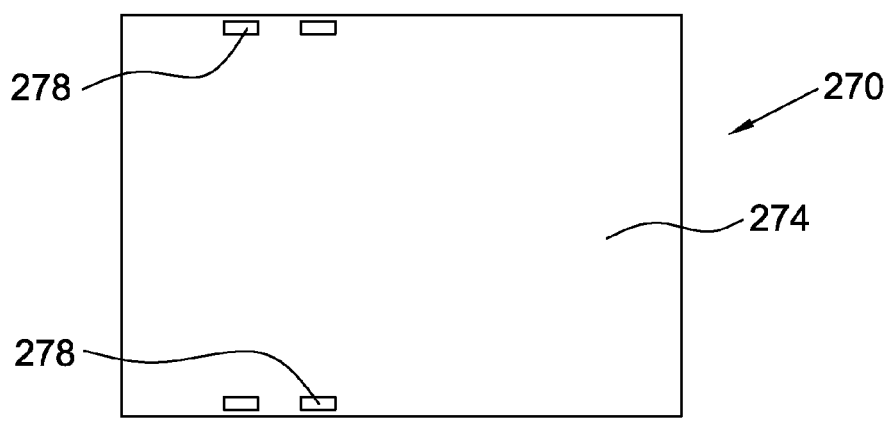
FIG. 10 is a bottom view of the touch sensor of FIG. 6.

Referring to FIG. 10, in another embodiment, a plurality of electrical terminals 278 corresponding to the electrical terminals 119 on the upper surface 116 of the flame 110 is provided on a lower surface 274 of the touch sensor 270. When the touch sensor 270 is positioned on the frame 110, the electrical terminals 278 on the touch sensor 270 will be brought into electrical contact with the electrical terminals 119 on the flame 110. Similarly, a driving voltage may be applied to the touch sensor 270 through the wirings on the frame 110 thereby driving the touch sensor 270.

In order to facilitate the touch sensor 270 to be positioned on the frame 110, the hooking members 123 and/or 124 may be detached easily from the frame 110. When assembling the liquid crystal display 200 of the present disclosure, the hooking members 123, 124 are detached from the frame 110 first so that the touch sensor 270 may be pushed to the top of the LCD panel 240. Afterward, the detached hooking members 123, 124 are mounted on the frame 110 to secure the touch sensor 270 on the frame 110.

In another embodiment, the hooking members 121, 122, 123, 124 are elastic and are attached to the frame 110. For example, the hooking members 121, 122, 123, 124 may be elastic sheets. When assembling the liquid crystal display 200, the hooking members 121, 122, 123, 124 are pulled outwardly such that the touch sensor 270 may be put down to the top of the LCD panel 240. Afterward, the pull force is removed, the elastic hooking members 121, 122, 123, 124 will return to their original positions to secure the touch sensor 270 on the frame 110.

According to the liquid crystal display 200 of the present disclosure, the hooking members 121, 122, 123, 124 may secure the touch sensor 270 on the backlight module 280 without need of using double-sided tapes or optical adhesive. This solves the prior art problems.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A liquid crystal display, comprising: a frame having an indentation, the frame having a first side surface, a second side surface, a third side surface, and a fourth side surface wherein the first side surface faces the third side surface and second side surface faces the fourth side surface, the first and third side surfaces connect with the second and fourth side surfaces;
    a backlight module positioned in the indentation of the frame;
    a plurality of hooking members positioned on the first, second, third and fourth side surfaces, respectively, each of the hooking member having a side portion extending from the frame and a top portion extending from the side portion toward the indentation, wherein an accommodation room is defined between the top portion and an upper surface of the frame, and the hooking member positioned on the third side surface is detachable from the frame;
    a liquid crystal display (LCD) panel positioned on a backlight module in a detachable manner, wherein sides of the LCD panel are positioned in the accommodation rooms; and
    a touch sensor positioned on the LCD panel, wherein sides of the touch sensor are positioned in the accommodation rooms;
    wherein the top portions of the hooking members press the LCD panel and touch sensor upon the upper surface of the frame to secure the LCD panel and touch sensor on the frame;
    a plurality of third electrical terminals provided on the upper surface of the touch sensor, and a plurality of fourth electrical terminals provided on the upper surface of the top portion of at least one of the hooking members, wherein the third electrical terminals are in electrical contacts with the corresponding fourth electrical terminals.

2. The liquid crystal display as claimed in claim 1, wherein the touch sensor is positioned on the LCD panel in a detachable manner.

3. The liquid crystal display as claimed in claim 1, wherein the hooking member positioned on the fourth side surface is detachable from the frame.

4. The liquid crystal display as claimed in claim 1, wherein the hooking members positioned on the first, second and fourth side surfaces are elastic and are attached to the frame.

5. The liquid crystal display as claimed in claim 4, wherein the elastic hooking members are elastic sheets.

6. The liquid crystal display as claimed in claim 1, further comprising:
    a plurality of first electrical terminals provided on a lower surface of the LCD panel, and
    a plurality of second electrical terminals provided on the upper surface of the frame, wherein the first electrical terminals are in electrical contact with the corresponding second electrical terminals.

7. A liquid crystal display, comprising: a frame having an indentation, a frame having a first side surface, a second side surface, a third side surface, and a fourth side surface wherein the first side surface faces the third side surface and second side surface faces the fourth side surface, the first and third side surfaces connect with the second and fourth side surfaces;
    a backlight module positioned in the indentation of the frame;
    a liquid crystal display (LCD) panel positioned in the indentation of the frame and on the backlight module;
    a plurality of hooking members positioned on the first, second, third and fourth side surfaces, respectively, each of the hooking member having a side portion extending from the frame and a top portion extending from the side portion toward the indentation, wherein an accommodation room is defined between the top portion and an upper surface of the frame, and the hooking member positioned on the third side surface is detachable from the frame; and
    a touch sensor positioned on the LCD panel in a detachable manner, wherein sides of the touch sensor are positioned in the accommodation rooms;
    wherein the top portions of the hooking members press the touch sensor upon the upper surface of the frame to secure the touch sensor on the frame;
    a plurality of third electrical terminals provided on the upper surface of the touch sensor, and a plurality of fourth electrical terminals provided on the upper surface of the top portion of at least one of the hooking members, wherein the third electrical terminals are in electrical contacts with the corresponding fourth electrical terminals.

8. The liquid crystal display as claimed in claim 7, wherein the hooking member positioned on the fourth side surface is detachable from the frame.

9. The liquid crystal display as claimed in claim 7, wherein the hooking members positioned on the first, second and fourth side surfaces are elastic and are attached to the frame.

10. The liquid crystal display as claimed in claim 9, wherein the elastic hooking members are elastic sheets.

11. The liquid crystal display as claimed in claim 7, further comprising:
    a plurality of first electrical terminals provided on a lower surface of the touch sensor, and
    a plurality of second electrical terminals provided on the upper surface of the frame, wherein the first electrical terminals are in electrical contact with the corresponding second electrical terminals.

* * * * *